United States Patent [19]

Carver

[11] 4,230,167
[45] Oct. 28, 1980

[54] SNOW CHAIN BRACKET FOR VEHICLE WHEEL

[76] Inventor: Earl D. Carver, 740 Alexander St., Greenwood, Ind. 46142

[21] Appl. No.: 7,364

[22] Filed: Jan. 29, 1979

[51] Int. Cl.³ .............................. B60C 27/00
[52] U.S. Cl. ................... 152/233; 24/73 AC; 24/116 R; 24/129 B; 152/238; 248/205 R
[58] Field of Search .......... 152/233, 232, 231, 213 A, 152/213 R, 216, 220–230, 170, 178, 180; 248/205 R; 24/116 R, 129 B, 231, 68 TT, 69 TT, 73 AC, 79 CE

[56] References Cited

U.S. PATENT DOCUMENTS

| 1,360,806 | 11/1920 | Sherry | 152/232 |
| 2,458,522 | 1/1949 | MacKay | 152/229 |
| 2,539,517 | 1/1951 | Locke | 152/233 |
| 3,130,767 | 4/1964 | Davis | 152/223 X |

*Primary Examiner*—John T. Goolkasian
*Assistant Examiner*—Thomas Bokan
*Attorney, Agent, or Firm*—Woodard, Weikart, Emhardt & Naughton

[57] ABSTRACT

A snow chain and bracket combination for mounting to a vehicle wheel. The bracket includes a first wall which extends through the wheel between the wheel rim and spider. Each chain extends radially around the tire and has opposite ends connected to the opposite ends of the bracket by means of spring-biased clips. The bracket extends inwardly from the rim and is mounted by a lug nut onto the wheel spider. The bracket abuttingly engages additional lug nuts to prevent relative motion between the wheel and bracket.

10 Claims, 5 Drawing Figures

4,230,167

SNOW CHAIN BRACKET FOR VEHICLE WHEEL

BACKGROUND OF THE INVENTION

This invention is in the field of devices for mounting to a vehicle wheel for increasing the traction of the wheel. The tires normally used on automobiles and trucks provide insufficient traction for operation in snow, mud and gravel. Thus, the operator may either replace the tires with deeply grooved snow tires or may mount snow chains on the tire. The snow tires and/or chains must then be removed for operation when the snow, mud or gravel is not present. Removal of the snow tires is undesirable in view of the time and effort required in jacking the vehicle upwardly and then removing the rim from the vehicle. Likewise, removal of snow chains typically requires either removal of the tire from the vehicle or at least considerable effort in uncoupling various chain-mounting devices. Disclosed herein is a bracket which may be permanently mounted to the vehicle wheel with the snow chains then being mounted to the bracket in such a manner that the chains may be quickly and easily removed without removal of the bracket.

SUMMARY OF THE INVENTION

One embodiment of the present invention is a bracket for mounting snow chains to a vehicle wheel comprising a member having a first end portion and a second end portion and being extendable through a vehicle wheel to position the first end portion and the second end portion on opposite sides of the wheel, first means on the first end portion and the second end portion operable to engage and hold opposite ends of a snow chain extending radially around the vehicle wheel, second means on the member extending from the first end portion and positionable against the vehicle wheel, and third means to releasably secure the second means to the vehicle wheel and limit relative motion therebetween.

Another embodiment of the present invention is the combination of a vehicle wheel securable to an axle by fasteners and having a rim and spider fixedly mounted thereto, the spider including a central axle hole and a plurality of mounting bosses spaced around the axle hole to receive the fasteners, a tire mounted on the rim, at least one snow chain extending around the tire and having opposite ends located on opposite sides of the wheel, first mounting means extending through the wheel between the rim and spider and having opposite end portions, connecting means connecting the opposite ends to the opposite end portions and operable to allow release of at least one of the ends from one of the end portions, and second mounting means extending from the first mounting means to at least one of the mounting bosses to be secured thereto by one of the fasteners.

A further embodiment of the present invention is a snow chain bracket combination for mounting to a vehicle wheel having a rim with attached spider comprising a first wall with opposite end portions and extendable through the wheel between the rim and spider, at least one chain extending radially around the wheel and having opposite ends connected to the first wall, connecting means connecting the opposite ends of the chain to the opposite end portions of the first wall and operable to allow at least one of the ends to be unconnected from one of the end portions, a second wall having a proximal end portion, an intermediate portion, and a distal end portion with the proximal end portion connected to the first wall adjacent one of the end portions, the second wall extends at the proximal end portion from the first wall toward the distal end portion which is joined thereto by the intermediate portion, the distal end portion includes a lug bolt hole and a pair of lug-engaging corners to cooperatively limit relative motion of the second wall relative to the wheel.

It is an object of the present invention is to provide a bracket for mounting snow chains to a vehicle wheel wherein the chains may be easily and quickly removed.

Yet another object of the present invention is to provide a snow chain and bracket combination with the chain being removable without the necessity of removing the bracket from the wheel.

Yet a further object of the present invention is to provide a new and improved wheel and snow chain combination.

Related objects and advantages of the present invention will be apparent from the following description.

DESCRIPTION OF THE PREFERRED EMBODIMENT

Figure 1:
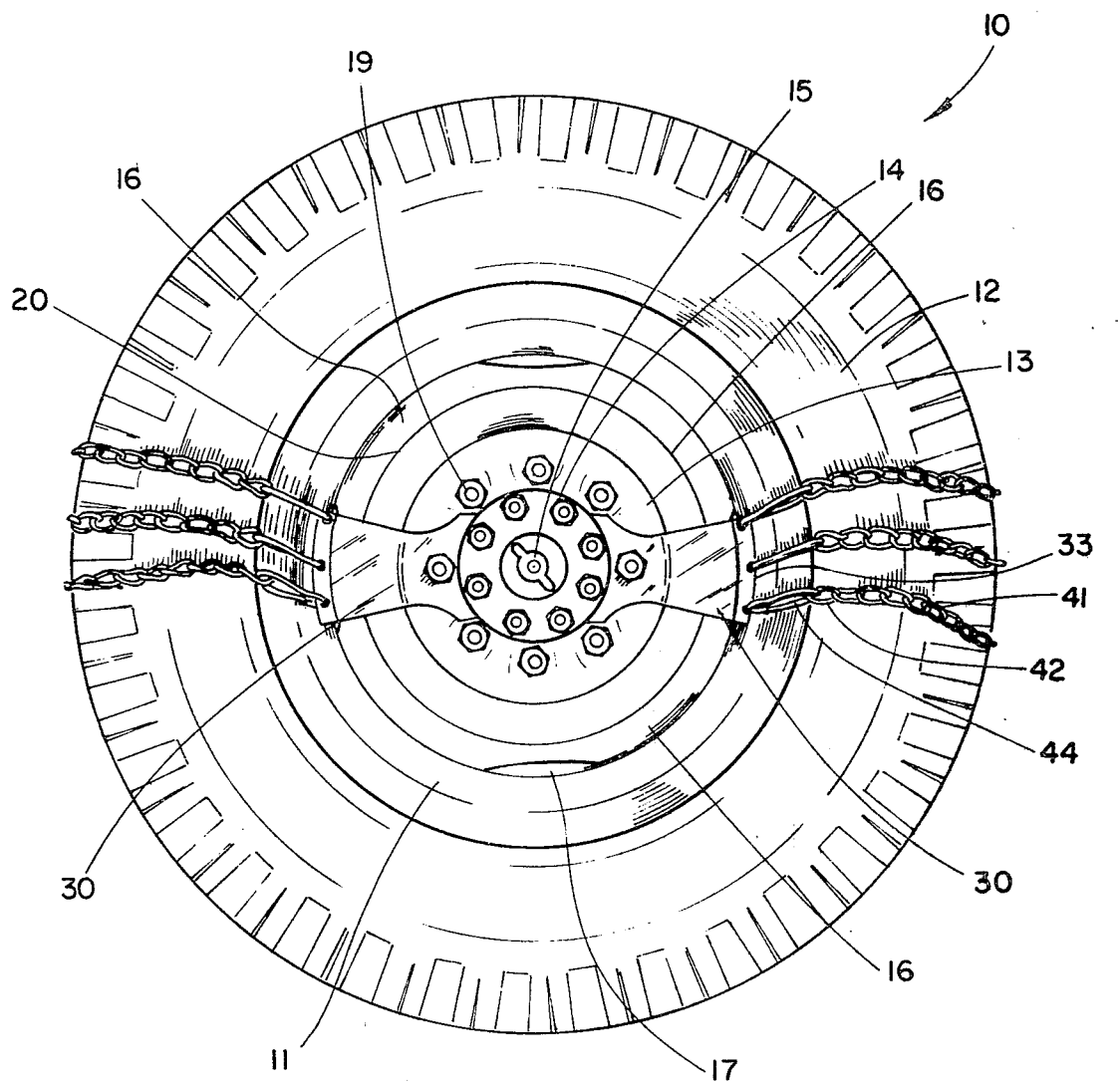
FIG. 1 is a side view of a vehicle wheel having a chain and bracket combination mounted thereon.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a vehicle wheel 10 such as found on either a truck or automobile. Wheel 10 includes a conventional metal rim upon which tire 12 is mounted. Integrally attached to rim 11 is a conventional spider 13 having a center axle hole 14 through which axle 15 projects. Spider 13 is attached at various locations 16 along its circumferential edge to the rim with a number of gaps 17 present between the rim and spider at places where the spider is not attached to the rim. Spider 13 includes a plurality of conventional mounting bosses positioned around the center axle hole 14 to receive the mounting lugs which project from the axle through the spider. Hexagonally shaped nuts 19 are threaded onto the lugs which project through the mounting bosses of the spider thereby removably securing the spider, rim and tire to the axle. Spider 13 is also provided with a conventional strengthening rib 20 which extends around the spider adjacent rim 11. As mentioned, the rim and spider are conventional in construction.

Figure 2:
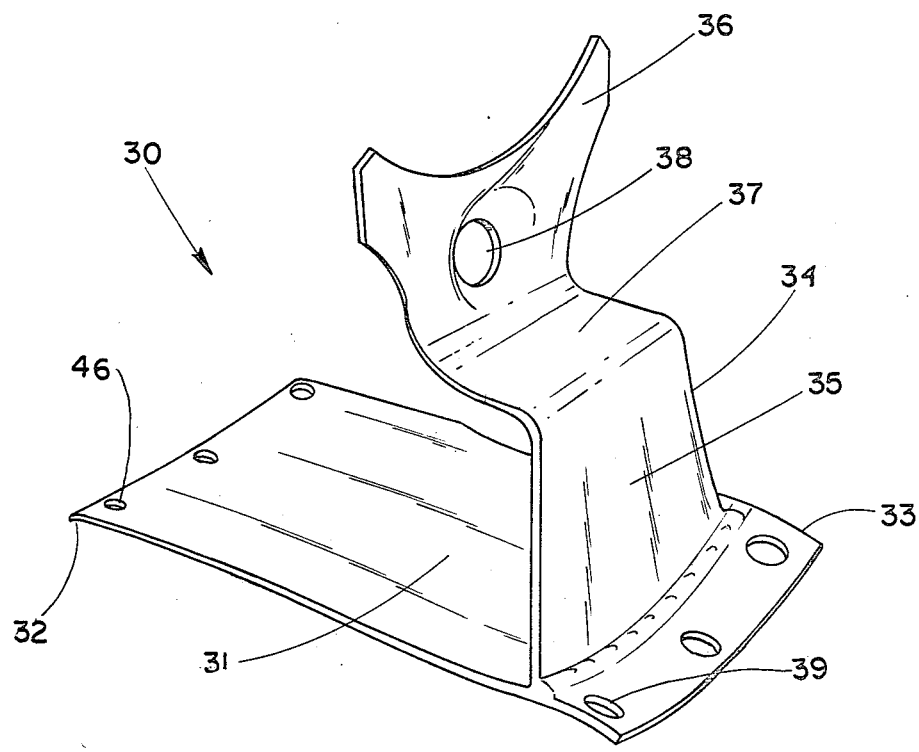
FIG. 2 is an enlarged perspective view of the bracket for mounting the chains to the wheels shown in FIG. 1.
Figure 4:
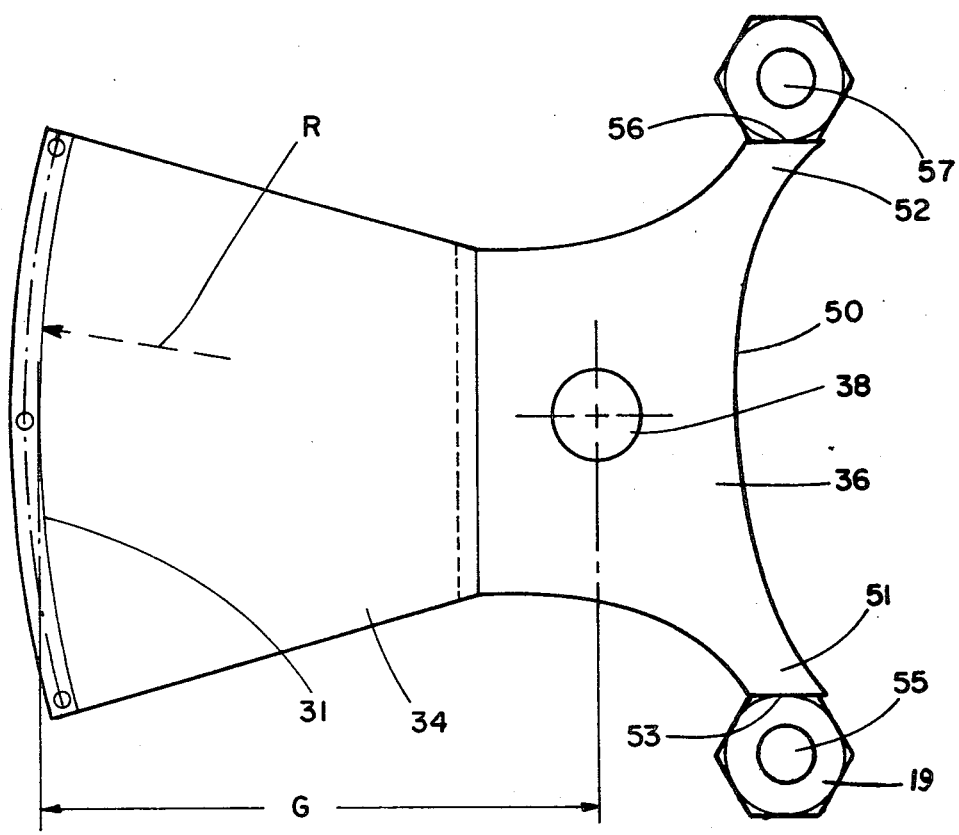
FIG. 4 is a top view of the bracket shown in FIG. 2.

A pair of brackets 30 are used to mount the snow chains to the wheel with one of the brackets 30 being shown in FIG. 2. Bracket 30 includes a member or first wall 31 having a pair of opposite end portions 32 and 33 with wall 31 being extendable through one of the gaps 17 so as to position end portions 32 and 33 on the opposite sides of the wheel. Integrally attached to wall 31 adjacent end portion 33 is a second wall 34 (FIG. 4) which is used for mounting bracket 30 to the wheel. Wall 34 has a proximal end portion 35 (FIG. 2) attached to wall 31 and integrally joined to distal end portion 36 by an intermediate portion 37. The proximal end portion 35 extends perpendicularly from wall 31 toward distal end portion 36 which is parallel but offset from wall portion 35 and joined thereto by the intermediate portion 37. Distal end portion 36 includes a lug bolt hole 38 through which one of the lugs extending through the mounting bosses of the spider projects with a nut 19 then being used to secure bracket 30 to the spider.

Figure 5:
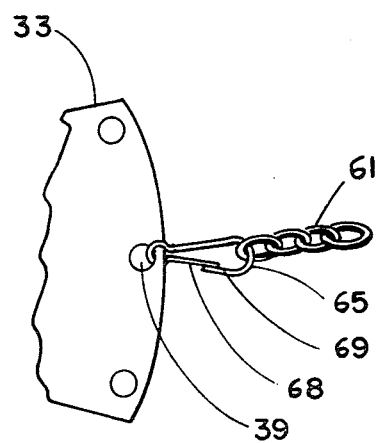
FIG. 5 is an enlarged fragmentary view of end portion 33 of bracket 30 shown in FIG. 2.

Each end portion 32 and 33 of wall 31 includes a plurality of apertures 39 and holes 46 for receiving one of the spring clips 40 for mounting the chains to the bracket. Each chain extends radially around the tire having a pair of opposite ends joined to end portions 32 and 33 by spring clips. For example, chain 41 extends radially around tire 12 and has a pair of opposite ends 42 and 43 (FIGS. 1 and 3) positioned on the opposite sides of the tire. A pair of conventional spring clips 44 and 45 are respectively connected to ends 42 and 43 of chain 41 with clips 44 and 45 extending respectively through holes 39 and 46 of end portions 33 and 32 of wall 31. A fragmentary view of end portion 33 is shown in FIG. 5 with clip 65 having a movable spring-biased leg 68 which may be moved relative to leg 69 of the clip so as to allow removal of the clip from hole 39 or removal of chain 61 from the clip. All of the chains and clips are identical.

Wall 31 (FIG. 4) has a radius of curvature "R" forming a concave plate as viewed from the distal end portion 36 of wall 34 toward wall 31. The radius of curvature of wall 31 allows the wall to be positioned in gap 17 adjacent the wheel rim without interference between the bracket and the spider and rim. Likewise, the distal end portion 36 includes a curved edge 50 which extends partially around the axle hole of the spider thereby preventing interference between the bracket and vehicle axle. The lug bolt hole 38 is positioned between curved edge 50 and wall 31 with hole 38 being located from wall 31 a fixed distance "G." Distal end portion 36 has a pair of extensions which terminate in corners 51 and 52 with each corner located a distance from wall 31 greater than distance G. Curved edge 50 extends from corner 51 toward hole 38 and back to the remaining corner 52. Each corner 51 and 52 form a nut-engaging stop surface for limiting rotational movement of the nut immediately adjacent the corner. For example, corner 51 includes a stop surface 53 (FIG. 4) which abuttingly engages one of the side surfaces of the hexagonally shaped nut 19 threadedly received by lug 55. Likewise, corner 52 includes stop surface 56 which engages a side surface of a nut threaded onto lug 57 attached to the axle and projecting through the spider to mount the rim to the axle. Both stop surfaces 56 and 53 are located a distance greater than distance G from wall 31. The mounting bosses provided on spider 13 are positioned equidistant around the axle bolt hole and are located along a circle which extends around the axle bolt hole so as to receive the similarly located lugs projecting outwardly from the axle. The opposite end portions 32 and 33 (FIG. 2) are flared outwardly away from wall 34 in order to increase the strength of the bracket.

Figure 3:
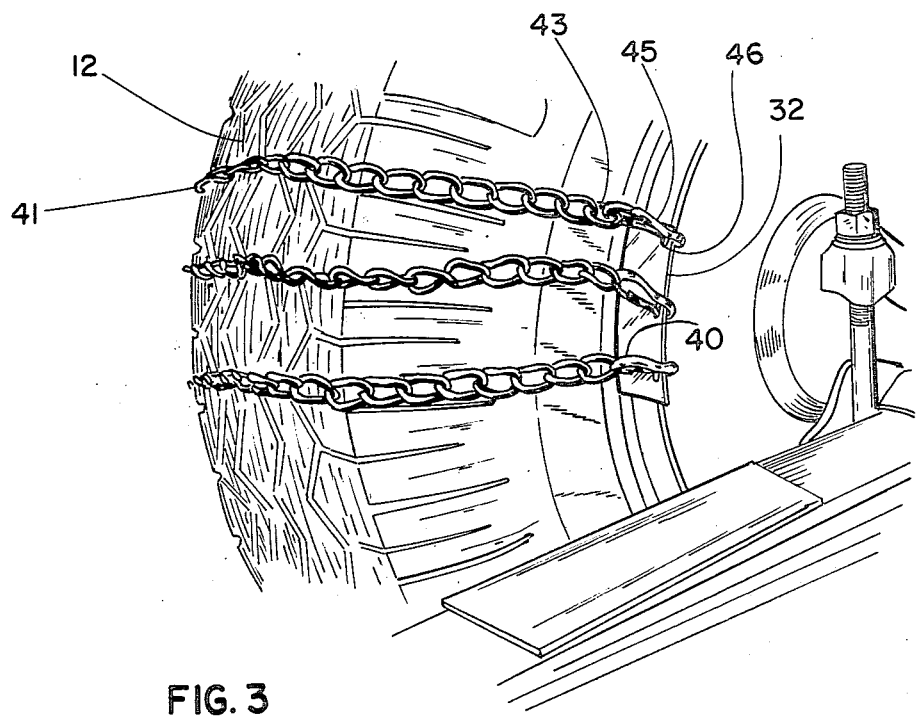
FIG. 3 is a view of the opposite side of the vehicle wheel shown in FIG. 1.

The holes provided on end portions 32 and 33 along with the spring clips provide a means to engage and hold the opposite ends of the chains. Thus, once wall 31 is slipped into gap 17 and a lug is positioned so as to extend through hole 38 with the hexagonally shaped nut threadedly mounted onto the lug extending through hole 38, the bracket is in place to receive the chains. When mounting the bracket 30, the stop surfaces 53 and 56 should be positioned so as to engage side surfaces of the hexagonally shaped nuts located on either side of the lug extending through hole 38. The chains may be extended radially around the tire such as shown in FIG. 3 with one end of each chain being fastened to end portion 32 with the spring clips and with the opposite ends then being fastened to portion 33 which is located on the outwardly facing side of the spider. In the event it is desired to remove the chains, bracket 30 may be left in place and the spring clips may be used to remove the chains from the bracket.

Wall 34 provides a means which extends from wall 31 and is positionable against the spider of the wheel so as to allow for the mounting of the bracket. The hexagonally shaped nut threaded onto the lug extending through hole 38 of the bracket provides a means to releasably secure the bracket to the vehicle wheel and to cooperatively with stop surfaces 53 and 56 limit relative motion between the bracket and wheel. Bracket 30 includes distal end 36 offset from portion 35 by intermediate portion 37 so as to provide a relief to receive spider rib 20. The rib is nestingly received immediately adjacent the proximal end portion 35 and the intermediate portion 37 of wall 34.

It will be obvious from the above description that the present invention provides a new and improved snow chain bracket which may be quickly and easily mounted to the vehicle wheel. It will be further obvious that in addition to the bracket, the snow chain may be mounted or removed from the vehicle wheel simply by connecting or disconnecting the chains from the bracket.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A bracket for mounting snow chains to a vehicle wheel having a rim and attached spider comprising:
   a first wall with opposite end portions and extendable through said wheel between said rim and spider to position said end portions on opposite sides of said wheel;
   fastening means including fasteners on said opposite end portions operable to releasably engage and hold a snow chain extending radially around said wheel; and
   a second wall having a proximal end portion, an intermediate portion, and a distal end portion with said proximal end portion connected to said first wall adjacent one of said end portions, said second wall extends at said proximal end portion of said first wall toward said distal end portion which is joined thereto by said intermediate portion, said distal end portion includes a lug bolt hole and a pair of lug-engaging corner portions with stop surfaces to cooperatively limit relative motion of said second wall relative to the wheel.

2. The bracket of claim 1 wherein said first wall has a radius of curvature with a concave configuration as viewed from said distal end portion of said second wall toward said first wall, said distal end portion of said second wall has a curved edge extending between said lug-engaging stop surfaces forming an axle relief.

3. A bracket for mounting snow chains to a vehicle wheel comprising:
a member having a first end portion and a second end portion and being extendable through a vehicle wheel to position said first end portion and said second end portion on opposite sides of said wheel;
first means including fasteners on said first end portion and said second end portion operable to engage and hold opposite ends of a snow chain extending radially around the vehicle wheel;
second means on said member extending from said first end portion and positionable against said vehicle wheel;
third means to releasably secure said second means to said vehicle wheel and limit relative motion therebetween and wherein:
said second means is a wall with a proximal end portion fixedly secured to said member;
said wall has a distal end portion with spaced-apart opposite edge portions, each forming a nut-engaging stop surface positioned a given distance from said member;
said wall further includes a lug bolt hole positioned a distance from said member less than said given distance;
said member has a radius of curvature forming a concave plate as viewed from said distal end portion toward said member;
said distal end portion includes a curved edge extending from one of said opposite edge portions toward said lug bolt hole and back to the other of said opposite edge portions forming an axle relief.

4. The combination of:
a vehicle wheel securable to an axle by fasteners and having a rim and spider fixedly mounted thereto, said spider including a central axle hole and a plurality of mounting bosses spaced around said axle hole to receive said fasteners;
a tire mounted on said rim;
at least one snow chain extending around said tire and having opposite ends located on opposite sides of said wheel;
first mounting means extending through said wheel between said rim and spider and having opposite end portions;
connecting means connecting said opposite ends to said opposite end portions and operable to allow release of at least one of said ends from one of said end portions; and
a second mounting means extending from said first mounting means to at least one of said mounting bosses to be secured thereto by one of said fasteners.

5. The combination of claim 4 wherein:
said second mounting means includes a lug bolt hole positioned adjacent one of said mounting bosses and secured thereto by one of said fasteners, said hole is positioned from said first mounting means a fixed distance;
said mounting bosses are located equidistant along a circle surrounding said axle hole;
said second mounting means further includes a pair of extensions, each with a stop edge abuttingly engaging a separate one of said fasteners and limiting rotational movement between said first mounting means and said wheel, each stop edge located from said first mounting means a distance greater than said fixed distance.

6. The combination of claim 5 wherein:
said connecting means includes a plurality of spring-biased clips connecting said chains to said first mounting means;
said first mounting means includes a wall with opposite flared ends, each including a plurality of apertures to removably receive said spring-biased clips.

7. A snow chain bracket combination for mounting to a vehicle wheel having a rim with attached spider comprising:
a first wall with opposite end portions and extendable through said wheel between said rim and spider;
at least one chain extending radially around said wheel and having opposite ends connected to said first wall;
connecting means connecting said opposite ends of said chain to said opposite end portions of said first wall and operable to allow at least one of said ends to be unconnected from one of said end portions;
a second wall having a proximal end portion, an intermediate portion, and a distal end portion with said proximal end portion connected to said first wall adjacent one of said end portions, said second wall extends at said proximal end portion from said first wall toward said distal end portion which is joined thereto by said intermediate portion, said distal end portion includes a lug bolt hole and a pair of lug-engaging corners to cooperatively limit relative motion of said second wall relative to the wheel.

8. The combination of claim 7 wherein:
said first wall has a radius of curvature with a concave configuration as viewed from said distal end portion of said second wall toward said first wall, said distal end portion of said second wall has a curved edge extending between said corners forming an axle relief.

9. The combination of claim 7 wherein:
said first wall has three mounting apertures on each of said opposite end portions to releasably receive said connecting means which includes a plurality of spring-biased clips.

10. The combination of claim 7 wherein:
said intermediate portion of said second wall extends from said proximal end portion toward said distal end portion forming a spider rib relief.

* * * * *